United States Patent [19]

Fajeau

[11] 4,363,779

[45] Dec. 14, 1982

[54] PRESSURIZED WATER REACTOR

[75] Inventor: Maurice Fajeau, Pertuis, France

[73] Assignee: Commissariat a l'Energie Atomique, France

[21] Appl. No.: 186,900

[22] Filed: Sep. 15, 1980

[30] Foreign Application Priority Data

Sep. 28, 1979 [FR] France ................. 79 24221

[51] Int. Cl.³ .............................................. G21C 9/00
[52] U.S. Cl. ................................... 376/282; 376/298; 165/141
[58] Field of Search ................ 176/20, 37, 38, 60, 176/51, 56, 65; 165/141; 376/282, 298, 299

[56] References Cited

U.S. PATENT DOCUMENTS

| 2,396,235 | 3/1946 | Arvins et al. | 165/41 |
| 3,240,678 | 3/1966 | Hemmerle et al. | 176/38 |
| 3,718,539 | 2/1973 | West et al. | 176/38 |
| 4,021,301 | 3/1977 | Frei | 176/38 |
| 4,098,329 | 7/1978 | Culver | 176/65 |
| 4,123,909 | 11/1978 | French | 176/38 |
| 4,186,051 | 1/1980 | Buscher et al. | 176/65 |
| 4,235,284 | 11/1980 | Coleman | 176/141 |
| 4,239,596 | 12/1980 | Bevilacqua et al. | 176/65 |
| 4,249,994 | 2/1981 | Dolle | 176/37 |
| 4,278,500 | 7/1981 | Ailloud et al. | 176/38 |
| 4,282,062 | 8/1981 | Stiefel et al. | 176/37 |

FOREIGN PATENT DOCUMENTS

| 2243498 | 8/1974 | France . |
| 2314559 | 6/1976 | France . |
| 2334175 | 11/1976 | France . |
| 2351471 | 5/1977 | France . |
| 2390810 | 12/1978 | France . |

Primary Examiner—S. A. Cangialosi

[57] ABSTRACT

The invention relates more particularly to a pressurized water nuclear reactor in which the heat exchange between the primary and secondary circuits takes place by means of steam generators.

A reserve tank is placed in the secondary circuit parallel to the steam generator and inside or outside the latter. It is pressurized directly by the secondary fluid in the gaseous phase leaving the generator, so as to form a reserve increasing the inertia of the generator in the case of closing the steam and supply valves without significantly increasing it in the case of a fracture of the steam piping.

Application to pressurized water nuclear reactors.

9 Claims, 2 Drawing Figures

PRESSURIZED WATER REACTOR

BACKGROUND OF THE INVENTION

The present invention relates to nuclear reactors, particularly of the pressurized water type, incorporating a pressure enclosure containing the reactor core, called the vessel and at least one steam generator cooling the primary liquid by evaporating the secondary liquid.

The steam generators used in pressurized water reactors can be of the "single pass type". In this type of generator, the primary fluid generally enters via the upper end of the generator and leaves by the lower end. Single pass generators are to be compared with U-tube steam generators in which the primary fluid enters and leaves by the lower end of the generator. In U-tube generators, the secondary fluid mass is relatively large, whilst it is very small in the case of single pass generators and in actual fact 100 times lower in the case of compact, plate-type steam generators.

If it is necessary to stop the supply pump for the secondary circuit or suddenly close the valve supplying the secondary generator with secondary fluid in the liquid state, the removal of the residual power of the reactor takes place by reacting the secondary fluid in the steam generators before the stand-by circuits or systems come into action. The mass of secondary fluid contained in U-tube steam generators is generally sufficient to enable a removal of the residual power during a sufficiently long period of time before starting up the stand-by circuit, but this is not the case with regard to the secondary fluid mass contained in single pass steam generators. The value given hereinbefore shows that a plate-type steam generator has virtually a zero inertia.

When the steam generators used in pressurized water reactors are of the single pass type, it is therefore of interest or even necessary to increase the inertia of the generators so that the stand-by circuits come into action under favourable conditions.

BRIEF SUMMARY OF THE INVENTION

The present invention therefore proposes a nuclear reactor of the type defined hereinbefore, wherein a reserve tank is located in the secondary circuit parallel with the steam generator and at the same level as the latter, said reserve tank permanently being connected to the steam generator and containing a volume of secondary fluid in the liquid state surmounted by a volume of secondary fluid in the gaseous state.

As is apparent from the term used, the reserve tank according to the invention constitutes a reserve of secondary fluid directly pressurized by the secondary fluid in the gaseous state leaving the steam generator and whose arrangement parallel to the generator makes it possible to increase the inertia thereof and consequently aid the removal of the residual power of the reactor before starting up the stand-by circuits, when it is necessary to stop the supply pump for the secondary circuit or isolate the generator. Due to the permanent connection between the reserve tank and the steam generator, no human intervention is involved in the removal of the residual power by the reserve tank.

However, in the case of a cold accident, i.e. if a steam pipe fractures, most of the reserve is discharged without passing via the steam generator and consequently does not take part in the cooling of the reactor, thus obviating risk of redivergence of the reactor.

Obviously, the reserve tank is particularly suitable for association with a single pass generator. However, the invention is not limited to this type of generator and the tank can also be used for increasing the inertia of a U-tube generator.

According to another feature of the invention, a cooling circuit comprising a heat exchanger located within the reserve tank and above the minimum level of the gaseous secondary fluid is provided for removing the heat stored by the secondary fluid contained in the reserve tank. This cooling circuit makes it possible to continuously remove the residual power of the reactor and makes it possible to eliminate the high pressure stand-by supply circuit.

Each secondary circuit also generally comprises a valve for supplying the steam generator with liquid secondary fluid and a valve for supplying the turbine with gaseous secondary fluid. According to the invention, these valves are preferably positioned in such a way that the closing thereof isolates the system constituted by the steam generator and the reserve tank from the remainder of the secondary circuit.

According to a first embodiment of the invention, the reserve tank is positioned outside the steam generator.

In a first variant of this embodiment, the reserve tank communicates with that part of the secondary circuit entering the steam generator via a diaphragm.

In a second variant of this embodiment, the part of the secondary circuit entering the steam generator incorporates a pump positioned downstream of the reserve tank.

In both these variants, the diaphragm and the pump make it possible to regulate the fluid level in the tank by modifying the branched supply flow passing therethrough. However, neither the diaphragm nor the pump constitute isolating means between the reserve tank and the generator.

According to a second embodiment of the invention when the steam generator comprises a vertically axed cylindrical envelope which defines at its ends two annular chambers containing the primary fluid and connected by a group of annular tubes and with the secondary fluid entering the envelope in the liquid state by an axial pipe and leaving it in the gaseous state by a second axial pipe, the two axial pipes traversing the annular chambers, the reserve tank is located in the central space defined by the group of tubes.

At its lower end, the reserve tank is also linked with the feed water by means of calibrated holes and is directly linked by its upper end with the gaseous secondary fluid in the envelope.

The invention also relates to a steam generator for use in a nuclear reactor of this type.

BRIEF DESCRIPTION OF THE DRAWINGS

The invention is described in greater detail hereinafter relative to two non-limitative embodiments, with reference to the attached drawings, wherein.

DETAILED DESCRIPTION OF THE PREFERRED EMBODIMENTS

Figure 1:
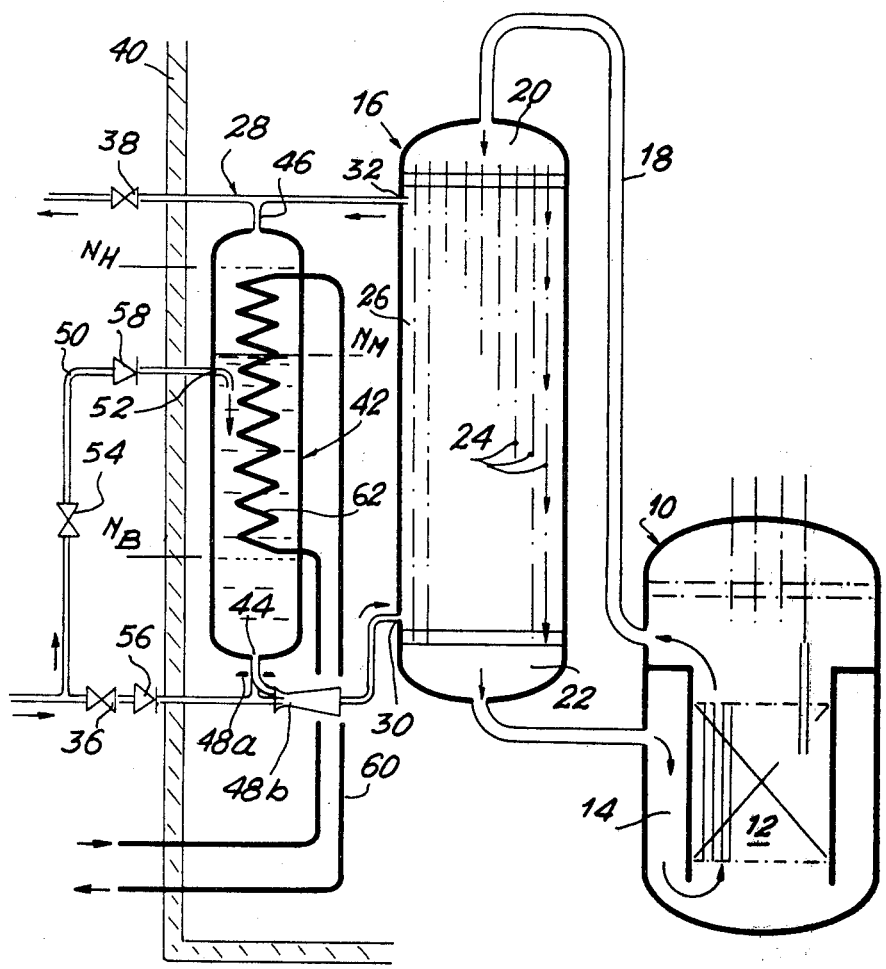
FIG. 1 is a diagrammatic view of a primary circuit and part of a secondary circuit of a pressurized water nuclear reactor incorporating a reserve tank according to the invention.

FIG. 1 very diagrammatically shows the pressure enclosure 10 of a pressurized water nuclear reactor, whose core 12 positioned within enclosure 10 is traversed by cooling fluid 14 circulating in the direction of the arrows. The cooling fluid 14 extracts the heat given off by nuclear fision in the reactor core and this heat is transferred by several primary circuits 18 to steam generator 16. For simplification purposes, FIG. 1 only shows a single primary circuit 18 and generator 16 which corresponds thereto.

The steam generator 16 shown in FIG. 1 is a single pass generator in which the primary fluid enters by an intake chamber 20 located at the upper end of the generator and leaves it by a discharge chamber 22 located at the lower end of the generator, after traversing a group of tubes diagrammatically represented at 24. When the primary fluid traverses the group of tubes 24, it exchanges its heat with a secondary fluid 26 flowing in a secondary loop 28. Therefore, the secondary fluid 26 which enters steam generator 16 in the liquid state by lower intake 30 leaves it in the gaseous state by upper outlet 32. The gaseous secondary fluid leaving generator 16 is carried by the secondary circuit 28 to one or more not shown turbines which it drives in order to convert the heat energy carried by fluid 26 into electrical energy. A not shown condenser makes it possible to re-liquefy the secondary fluid before the latter is carried by circuit 28 to the lower intake 30 of steam generator 16. A valve 36 for supplying steam generator 16 with liquid secondary fluid and a valve 38 for supplying the not shown turbines with gaseous secondary fluid and located in the secondary circuit 28, respectively upstream and downstream of generator 16. Preferably, valves 36 and 38 are located outside the confinement enclosure 40 of the reactor.

According to the invention, a reserve tank 42 is located in secondary circuit 28 parallel with the steam generator 16 and at the same level as the latter. More specifically, in the embodiment of FIG. 1, the reserve tank 42 is positioned outside the steam generator 16 and is connected with circuit 28 both by a pipe 44 connecting the lower end of tank 42 to the upper part of circuit 28 disposed between the supply valve 36 and the intake 30 of generator 16 and by a pipe 46 connecting the upper end of the tank to that part of circuit 28 positioned between the outlet 32 of the generator and valve 38. The other part of reserve tank 42 is thus directly linked by pipe 46 with the gaseous secondary fluid leaving the generator 16. The secondary fluid 26 contained in the reserve tank 42 is consequently pressurized by the gaseous secondary fluid in generator 16 as a result of the permanent connection between tank 42 and the latter by means of pipes 44 and 46.

The connection between the liquid phases of the secondary fluid contained in reserve tank 42 and generator 16 is either limited by a diaphragm 48a positioned in pipe 44 or increased by a pump 48b positioned in secondary circuit 28 between pipe 44 and lower intake 30 of generator 16. Although diaphragm 48a and pump 38b are both shown in FIG. 1, it is obvious that only one of these members is used in practice. Thus, both pump 48b and diaphragm 48a serve to regulate the level in the reserve tank by acting on the branched supply flow passing through pipe 50. Neither diaphragm 48a nor pump 48b constitute isolating means between the reserve tank and the generator.

Pipe 50 is positioned between secondary circuit 28 upstream of supply valve 36 and an opening 52 issuing into tank 42 above its median portion. Pipe 50 links the reserve tank with the liquid secondary fluid carried by circuit 28. This connection is controlled by a valve 54. Moreover, two check valves 56, 58 are positioned respectively downstream of valves 36 and 54 in main circuit 28 and in pipe 50 in order to allow a secondary fluid flow only in the direction of the arrows in FIG. 1.

In order to remove the heat in reserve tank 42, if valves 36, 38 and 54 are closed and auxiliary cooling circuit 60 carrying a suitable cooling liquid has a portion, e.g. in the form of a coil 62 positioned within the reserve tank 42. The coil-like portion 62 is positioned above the level of the secondary fluid in the liquid state when the latter occupies its lowest level $N_B$.

In the embodiment of FIG. 1, tank 42 is positioned within enclosure 40. However, this arrangement is not limitative and could also be positioned outside enclosure 40.

During the normal operation of the reactor, the heat given off by the core is extracted by the primary fluid 14 and carried in each of the circuits 18 up to the corresponding generator 16. The secondary fluid circulating in each of the circuits 28 enters each of the generators 16 in the liquid state by lower intake 30 and leaves them in the gaseous state by upper outlet 32. It then drives turbines associated, for example, with not shown electrical generators.

Due to the direct connection between the upper part of tank 42 and that part of secondary circuit 28 positioned downstream of outlet 32 of generator 16 the secondary fluid in the liquid state within the tank 42 is at the pressure of the secondary fluid in the gaseous state leaving the steam generator. The level of the secondary fluid in the liquid state leaving the tank 42 can therefore be maintained at a reference level or mean level $N_M$ by acting on valve 54, bearing in mind the existence of the diaphragm or pump in the connection between the lower parts of the tank and the steam generator.

In the hypothesis of closing valve 38, there is an emergency shut down of nuclear reaction and closing of valves 36 and 54. In this case, the residual power of the primary circuit heats the secondary water both of steam generator 16 and tank 42, thus increasing the delays necessary for starting up the cooling circuit 60 which condenses the vapour of tank 42 via coil 62. The level of the secondary fluid in the liquid state in the reserve tank is thus kept constant. The residual power carried up to steam generator 16 by primary fluid 14 is consequently transferred by the generator to the secondary fluid 26 and then by natural circulation of this fluid to the reserve tank 42, from where it is removed by the cooling circuit 60.

In the hypothesis of the stoppage of the feed pump, there is an emergency shut down of nuclear reaction, followed by the closure of valve 38 before reaching the low level in the tank, so that we once again arrive at the aforementioned state.

In the hypothesis of the fracture of branch 28, there is a simultaneous depressurization of steam generator 16 and of tank 42. Only a fraction of the total mass of secondary water then passes through the steam generator and the cooling of the primary circuit remains limited, thus obviating a redivergence of the nuclear reaction.

Figure 2:
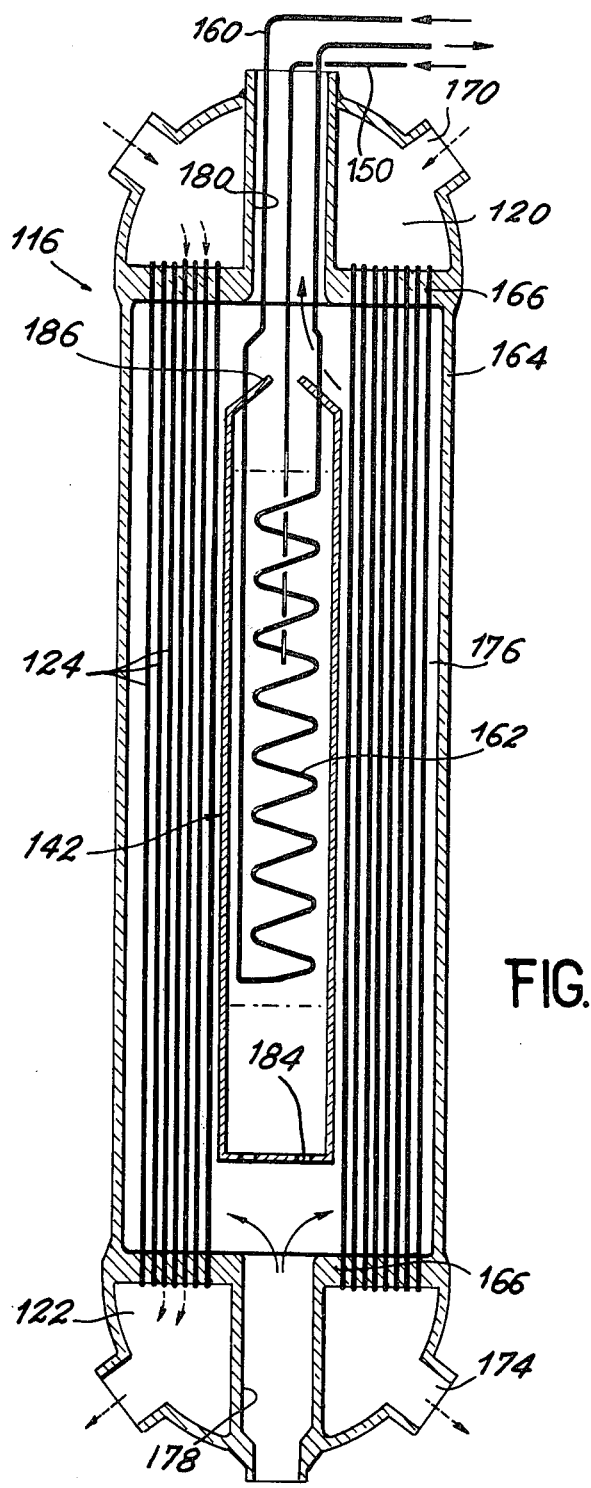
FIG. 2 is a longitudinal sectional view of a Trepaud-type steam generator containing a reserve tank according to a second embodiment of the invention.

In the embodiment of FIG. 2, there is a separate representation of a steam generator 116 for ensuring a heat transfer between a primary circuit and a secondary circuit of a pressurized water nuclear reactor of the type described with reference to FIG. 1. However, this embodiment differs from the previous embodiment in that the reserve tank 142 is arranged in parallel and directly within the steam generator 116.

More specifically, steam generator 116 is of the Trepaud type. Thus, it comprises a vertically axed cylindrical envelope 164 having a central tubular portion and two hemispherical ends. The central portion of envelope 164 is separated from each of the hemispherical ends by two partitions 166 defining within envelope 164 an intake chamber 120 and a discharge chamber 122 for the primary fluid and an intermediate chamber 176. The intake chamber 120 and discharge chamber 122 for the primary fluid are respectively positioned at the upper and lower ends of the steam generator. They are connected to the primary circuit by intake 170 and outlet 174 respectively. Intermediate chamber 176 is connected to the secondary circuit by axial intake pipe 178 and axial discharge pipe 180 which respectively traverse chambers 122 and 120 in such a way that each of these chambers is annular.

A group of tubes 124 parallel to the axis of generator 116 links intake chamber 120 with discharge chamber 122. The group of tubes 124 is also annular and defines a central space in which is located the reserve tank 142.

In this embodiment, the lower part of reserve tank 142 is linked with the feed water by means of calibrated holes 184. The upper partition of tank 142, which is frustum-shaped, has a central opening 186 in the extension of axial pipe 180 and via which it is connected to the upper part of chamber 176. The reserve tank feed water is preferably passed through this opening by means of pipe 150. As in the previous embodiment, there is a cooling circuit 160 incorporating a coil 162 located within the reserve tank 142 to ensure the cooling of the secondary fluid contained in this tank.

The operation of a nuclear reactor having steam generators of the type described with reference to FIG. 2 is the same as the operation of the reactor described with reference to FIG. 1.

Obviously, the invention is not limited to the embodiments described and represented hereinbefore and numerous variants are possible thereto without passing beyond the scope of the invention.

What is claimed is:

1. A nuclear reactor comprising a pressure enclosure, a reactor core contained in said enclosure, at least one primary circuit in which a primary fluid circulates, a secondary circuit in which a secondary fluid circulates, a steam generator through which said primary fluid transfers heat given off in said reactor core to said secondary fluid, said steam generator having a vertically axed cylindrical envelope and a group of tubes in which the primary fluid circulates, said envelope having a lower intake for entry of the secondary fluid in a liquid state and an upper outlet whereby said secondary fluid leaves the envelope in a gaseous state, a reserve tank positioned in said secondary circuit parallel and at the same time level as the steam generator, said reserve tank being permanently connected with the steam generator and containing a volume of said secondary fluid in the liquid state surmounted by a volume of said secondary fluid in the gaseous state, and a cooling circuit incorporating a heat exchanger located within the reserve tank and below a minimum level of said secondary fluid in the liquid state, said cooling circuit being adapted for removing heat transmitted to the secondary fluid contained in the reserve tank via the steam generator in case of failure of the secondary circuit.

2. A nuclear reactor according to claim 1, wherein the secondary circuit contains a valve for supplying secondary fluid to the steam generator and a valve for supplying secondary fluid in the gaseous state to a turbine, said valves being positioned such that their closure isolates a system constituted by the steam generator and the reserve tank from the remainder of the secondary circuit.

3. A nuclear reactor according to claim 1, wherein the reserve tank is positioned outside the envelope of the steam generator.

4. A nuclear reactor according to claim 3, wherein a diaphragm links the lower parts of the reserve tank and the steam generator, said diaphragm limiting the flow from the tank to the generator.

5. A nuclear reactor according to claim 3, wherein a pump links the lower parts of the reserve tank and the steam generator, said pump increasing the flow from the tank to the generator.

6. A nuclear reactor according to claim 2, wherein the reserve tank is positioned outside the envelope of the steam generator, and there is a pipe linking the reserve tank with the secondary circuit upstream of said steam generator supply valve, and a valve controlling the pipe for regulating the level of the secondary fluid in the liquid state in the reserve tank.

7. A nuclear reactor according to claim 6, wherein a check valve is positioned in said pipe downstream of the steam generator supply valve.

8. A nuclear reactor according to claim 1, wherein said envelope of the steam generator defines an upper annular chamber and a lower annular chamber for said primary fluid, said chambers being connected by said group of tubes, said group of tubes being annular and defining a central space, said upper outlet and said lower intake for the secondary fluid traversing respectively said upper annular chamber and said lower annular chamber, and said reserve tank being located within said central space.

9. A nuclear reactor according to claim 8, wherein a lower end of the reserve tank is linked by calibrated holes with the secondary fluid in the liquid state contained in the envelope and is directly linked by an upper end with the secondary fluid in the gaseous state contained in the envelope.

* * * * *